Jan. 25, 1927.
O. M. LEICH
1,615,766
VIBRATORY CONVERTER
Filed Nov. 21, 1921
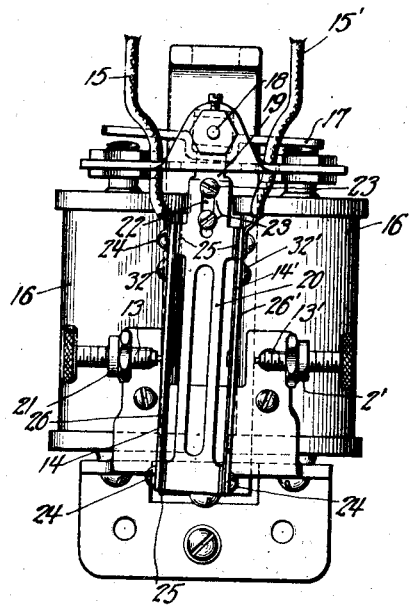
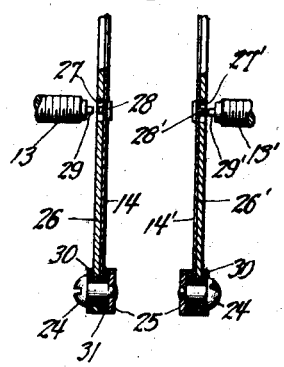
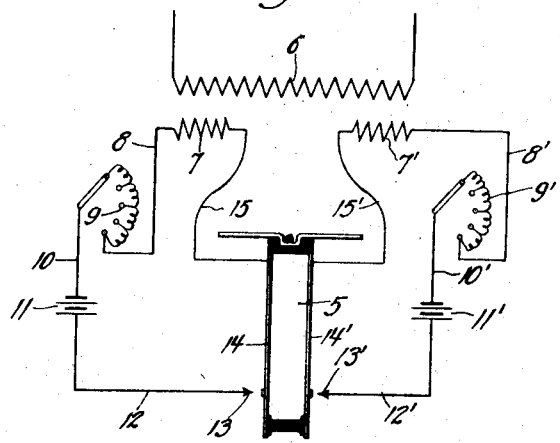
Inventor
Oscar M. Leich.
By: Gabel & Mueller
Attys.

Patented Jan. 25, 1927.

1,615,766

UNITED STATES PATENT OFFICE.

OSCAR M. LEICH, OF GENOA, ILLINOIS, ASSIGNOR TO LEICH ELECTRIC COMPANY, OF GENOA, ILLINOIS.

VIBRATORY CONVERTER.

Application filed November 21, 1921. Serial No. 516,733.

This invention relates to vibratory converters, and more particularly to a converter that is adapted to feed two different circuits from a transformer having a single primary winding.

It is a purpose of the invention to provide a vibratory converter of this character which is adapted to charge two batteries or supply current to any other two independent devices by means of two secondaries which cooperate with a single primary of a transformer, which secondaries are connected in circuit with two spring members insulated from each other which are mounted on a rigid armature pivotally mounted on a suitable support.

It is a further purpose of the invention to provide a device of the above mentioned character which is provided with a pair of spring contacts mounted on the pivotally mounted armature, said springs being provided with suitable means to act as stops to limit the vibrations of the spring members in one direction, but permitting movement thereof in the opposite direction, thus dampening the vibrations of the springs. Cooperating with the springs are stationary contact members which are provided with connections leading to the batteries or other independent consumption circuits fed by the converter or rectifier above described.

Other objects and advantages of the invention will appear as the description of the accompanying drawings proceeds. However, I desire to have it distinctly understood that I do not intend to limit myself to the exact details shown in the drawings and described in the specification, but that I intend to include as part of my invention all such obvious changes and modifications of parts as would occur to a person skilled in this art and as would fall within the scope of the claims.

In the drawings:

Fig. 1 is a front elevation of my improved rectifier or converter;

Fig. 2 is a circuit diagram showing the use of the converter to charge two batteries through two independent circuits; and Fig. 3 is an enlarged detail longitudinal section of the lower end portion of the armature showing the construction thereof.

Referring in detail to the drawings, the improved vibratory converter 5 is adapted for use in charging two batteries from the same transformer by the use of a primary 6 and a pair of secondaries 7 and 7' as shown in Fig. 2. The secondaries 7 and 7' are independent of each other and are each parts of two independent circuits each of which comprises a contact member on the armature, a stationary contact cooperating therewith, a battery to be charged from the current passing through the circuit and a suitable resistance if desired said contacts being insulated from each other.

In Fig. 2 the secondary 7 is shown as being connected by means of a wire 8 with the variable resistance 9 from which a wire 10 leads to the battery 11, the other terminal of the battery being connected to the wire 12 which leads to the stationary contact 13 which cooperates with the contact 14 on the vibratory armature of the rectifier 5. The contact 14 is insulated from a similar contact 14' which cooperates with the stationary contact 13' corresponding to the contact 13 previously described and connected by the wire 12' with the battery 11' which is in turn connected at the other terminal thereof with the variable resistance 9' by means of the wire 10' and from the variable resistance 9' through the wire 8' to the secondary 7', the circuit including the secondary 7 being completed by the wire 15 leading back to the contact member 14 and the circuit in which the secondary 7' is located being completed by the wire 15' leading to the contact 14'.

It is essential in a device of this character that the vibratory element vibrates synchronously with the alternations in the current obtained from the transformer, as current impulses of the same polarity must always be received by each of the circuits. It has been found that satisfactory results and the highest efficiency can only be obtained where a pivoted armature is used, which armature is itself rigid but which is provided with spring contacts.

In order to obtain current for two different charging circuits from the same rectifier or converter, it is necessary to insulate the spring contacts from each other. The term rectifier as here used is, of course, used in a sense that includes a device for feeding all wave impulses that are in the same direction to the same consumption circuit. In Fig. 1 is shown a vibratory converter of the type that is to be used in a circuit of the character shown in Fig. 2, said converter comprising the electromagnets 16 with which the armatures 17, which is mounted on a transverse pivot 18, is adapted to cooperate. Said armature 17 is provided with a depending portion 19 on which is adjustably mounted the vertically extending member 20 which is adapted to vibrate between the stationary contact members 13 and 13′, which are adjustably mounted in the brackets 21 insulatingly mounted on the framework of the device. The adjustment between the member 20 and the member 19 is obtained by means of the slots 22 and the screws 23, this adjustment being necessary to obtain the proper period of vibration for the depending member 20.

Mounted on the member 20 are the contact members 14 and 14′ which are secured to the member 20 by means of the screws 24 passing through the ears 25 provided on the opposite end portions of the member 20. The members 14 and 14′ being secured at their ends and being made up from resilient material will serve as spring contacts having a small range of vibration relative to the supporting member 20. It is desirable that a certain amount of springiness exist in the contacts in order to provide for the proper cooperation thereof with the fixed contacts without interfering with the vibration of the armature and the associated parts. It is, however, not desirable to have a continued vibration of said spring members 14 and 14′ after contact has been made with the members 13 and 13′ as this would cause undesirable arcing and a break in the flow of the current. In order to reduce this vibration to a minimum, dampening members are provided which comprise strips of rigid sheet material 26 and 26′, which are clamped to the strips 14 and 14′ by means of the screws 24. The strips 26 and 26′ are provided with openings 27 and 27′ into which extend the contact points 28 and 28′ provided on the members 14 and 14′ to cooperate with the contact points 29 and 29′ on the fixed contacts 13 and 13′. The members 26 and 14 must be insulted from the members 26′ and 14′ to insure the proper operation of the device, and the method of insulating these parts is shown in Fig. 3.

It will be seen from Fig. 3 that the screws 24 have insulating sleeves 30 surrounding the same to insulate the same from the members 14 and 26, an insulating washer 31 being provided between each ear 25 and the corresponding contact member so that the screw 24 can enter the ear 25 to clamp the parts in position without placing the screw and the contact member and its bracing element into electrical connection with the member 20, thus insulating the two contact members on the vibratory element from each other. The leads 15 and 15′ terminate at the binding screws 32 and 32′, thus placing the same in electrical connection with the contact members to complete the circuit through the fixed and movable contacts as the member 20 moves from one fixed contact to the other.

Having thus described my invention, what I desire to claim and secure by U. S. Letters Patent is:

1. In a vibratory converter, a vibratory element comprising a supporting member, a spring contact member secured thereto at opposite ends thereof, a bracing strip of rigid material engaging one side of said spring contact member, said strip having an opening therein and a contact point on said spring contact member opposite each opening.

2. In a vibratory converter, a vibratory element comprising a supporting member having spaced supports thereon, a spring contact carrying member secured to said supports, a contact thereon between said supports, and a bracing member secured to said supports and extending between said supports alongside said contact carrying member to limit the movement thereof toward said bracing member, said bracing member being unattached to said spring member between said supports.

3. In a vibratory converter, a pivoted armature, electromagnetic means for vibrating said armature, a contact carrying element depending from said armature and mounted to vibrate therewith, having a pair of spring contact members on opposite sides thereof a pair of stationary contacts on opposite sides of said element and means for reducing the vibrations of said spring contacts, said means comprising stiffening strips secured to said contact carrying element and clamping the ends of said contact members between the same and said element.

4. In a vibratory converter, a pivoted armature, electromagnetic means for vibrating said armature, a contact carrying element depending from said armature and mounted to vibrate therewith, a pair of stationary contacts on opposite sides of said element, a pair of spring contacts mounted on said element, said contacts being insulated from each other, said spring contacts being secured to said element at the ends thereof, and being provided with a stiffening member to limit the movement thereof toward the cooperating stationary contact, said spring members being free to move in the opposite direction between the ends thereof.

5. In a vibratory converter, a vibratory element comprising a supporting member having spaced supports thereon, a spring contact carrying member secured to said supports, a contact thereon between said supports, and a rigid bracing member secured to said supports and extending between said supports alongside said contact carrying member to limit the movement thereof toward said bracing member said bracing member being unattached to said spring member between said supports.

6. In a vibratory converter, a vibratory element comprising a supporting member having spaced supports thereon, a taut spring contact carrying member secured to said supports, a contact thereon between said supports and a rigid bracing member secured to said supports and extending between said supports alongside said contact carrying member to limit the movement thereof toward said bracing member, said bracing member being unattached to said spring member between said supports.

In witness whereof, I hereunto subscribe my name this 18th day of October A. D., 1921.

OSCAR M. LEICH.